March 8, 1966 G. MARTORANA 3,238,742
TORQUE-TRANSMITTING RESILIENT COUPLINGS
Filed Dec. 10, 1963 2 Sheets-Sheet 1

INVENTOR
Giovanni Martorana,
BY
ATTORNEY

March 8, 1966     G. MARTORANA     3,238,742

TORQUE-TRANSMITTING RESILIENT COUPLINGS

Filed Dec. 10, 1963     2 Sheets-Sheet 2

Fig. 2

INVENTOR

Giovanni Martorana,

BY

ATTORNEY

United States Patent Office 3,238,742
Patented Mar. 8, 1966

3,238,742
TORQUE-TRANSMITTING RESILIENT
COUPLINGS
Giovanni Martorana, Milan, Italy, assignor to Societá
Applicazioni Gomma Antivibranti "SAGA" S.p.A.,
Milan, Italy
Filed Dec. 10, 1963, Ser. No. 329,511
Claims priority, application Italy, Oct. 15, 1963,
39,998
6 Claims. (Cl. 64—11)

This invention refers to a resilient coupling for joining an end of a rotary driving shaft to the facing end of a driven shaft whereby torque may be transmitted from one shaft to the other.

Such couplings are generally well known and they usually comprise a closed ring of circumferentially elongated, substantially rectilinear rubber blocks forming together a regular polygon as, for example, square, hexagonal, octagonal, etc. Each corner of said polygon is provided with a metal fitting for bolting the ring to a pair of spiders, one on each of said shafts. The spider arms are respectively bolted only to alternate ones of said fittings. That is, one spider would be bolted to each odd numbered corner while the other flange would be bolted to each even numbered corner of the polygonal ring.

During transmission of torque, the sides of the polygon located behind (in the direction of rotation) each fitting bolted to the driving shaft would be subjected to tension while the sides located ahead of these same fittings would be subjected to compression. One of the problems resulting from this tension was that the metal fittings tended to pull away from the rubber in the sides of the ring being subjected to such tension. This was overcome by making the rubber ring so that the centers of the fittings in the ring rested on a circle of a diameter larger than the diameter of the circle passing through the bolts on the spiders. This meant that the ring would have to be pre-compressed to the smaller diameter in order for the fittings on the ring to line up in axial direction with their respective bolts on the two spiders.

Once the ring was pre-compressed, in order for it to retain that pre-compressed state, it was necessary to keep its fittings in their exact positions while mounting the ring first on the bolts of a spider and then on the bolts of the other spider. In order to reduce the number of parts involved in assembling such a ring between the spiders, in order to reduce the cost of effecting such assembly, and in order to simplify such assembly, it would be desirable to be able to connect alternate fittings of the ring to a spider without regard to the exact location of the remaining fittings.

An object of this invention is to provide a pre-compressible resilient coupling ring which can be connected to one shaft without the necessity of its being pre-compressed and which requires precompression only when it is to be connected to the other shaft.

A further object is to provide a precompressible resilient coupling ring which can retain its precompressed condition by being connected to only one of the two shafts.

A further object is to provide a pre-compressible resilient coupling ring which requires a reduced number of parts for effecting connection to the two shafts, which requires less time for effecting said connection, and with which said connection can be effected easily.

This invention, therefore, which carries forth the above objects may be stated to comprise a resilient coupling ring of the type comprising an even number of substantially rectilinear elongated blocks of elastomeric material connected together to a form of a polygon having a fitting at every alternate corner thereof for connection to a spider on a first rotary shaft and a fitting at every other alternate corner thereof for connection to a spider on a second rotary shaft, and to be characterized by the fact that each set of alternate corners of the polygon is located on a different one of two circumferences of different diameters and further characterized by the fact that the ends of the arms of one of said spiders are permanently embedded in those alternate corners lying on the smaller of said two circumferences thereby forming the fittings in the last named corners, the fittings associated with the remaining corners being radially inwardly displaceable together with their corners to effect a pre-compression of said blocks.

The invention further comprises the joint resulting from the use of said coupling ring. This aspect of the invention includes a flexible joint connecting the facing ends of two rotary shafts so as to transmit torque from either one to the other, characterized by the fact that a first shaft has a spider attached thereto and a second shaft has an axially extending connection means thereon, and further characterized by the fact that the located on different ones of the circumferences of two flexible coupling ring as defined by the previous paragraph herein is interposed between said spider and said axially extending means with said axially extending means being connected to the spider fast with the coupling ring and with the spider on said first shaft being connected to the last mentioned fittings by means of bolts arranged on a circumference of a relatively reduced diameter such that the blocks are pre-compressed.

In other terms, the resilient coupling ring comprises an even number of substantially rectilinear elongated rubber blocks connected together to a form of an irregular, rather than a regular, polygon. This means that the alternate fittings of the ring have their centers respectively located on different ones of the circumferences of two circles of different diameters. The fittings located in the smaller circle are formed by the ends of the arms of a spider pertaining to one of the rotary shafts, without necessity of the coupling ring being pre-compressed.

The fittings located on the larger circle are attachable to the other spider but only after the ring is first pre-compressed by radially inwardly displacing these fittings so that they are made to lie on a smaller diameter circumference which coincides with the bolting diameter of this other spider.

The pre-compression force is applied to the coupling ring either during its being mounted on said other spider or in its manufacturing shop, by generally known means for pre-compressing coupling rings.

In the preferred embodiment disclosed herein the spider to which the coupling ring is attached without need for its being pre-compressed, is integral with the hereinbefore mentioned fittings located on the smaller circle. Said spider comprises a central hub which is easily mountable on a first rotary shaft and radially extending arms the free ends of which are embedded in each of the corners of the polygon which lie on the smaller circle thereby to form the fittings just mentioned above.

The invention will be best illustrated by reference to the following description directed to the attached drawings, in which:

FIGURE 2 is a sectional view taken along line II—II of FIGURE 1 and also showing the coupling ring in its relation to the two rotary shafts which are to be coupled together;

FIGURE 3 is a cross-sectional view of a modification of FIGURE 1.

Figure 1:
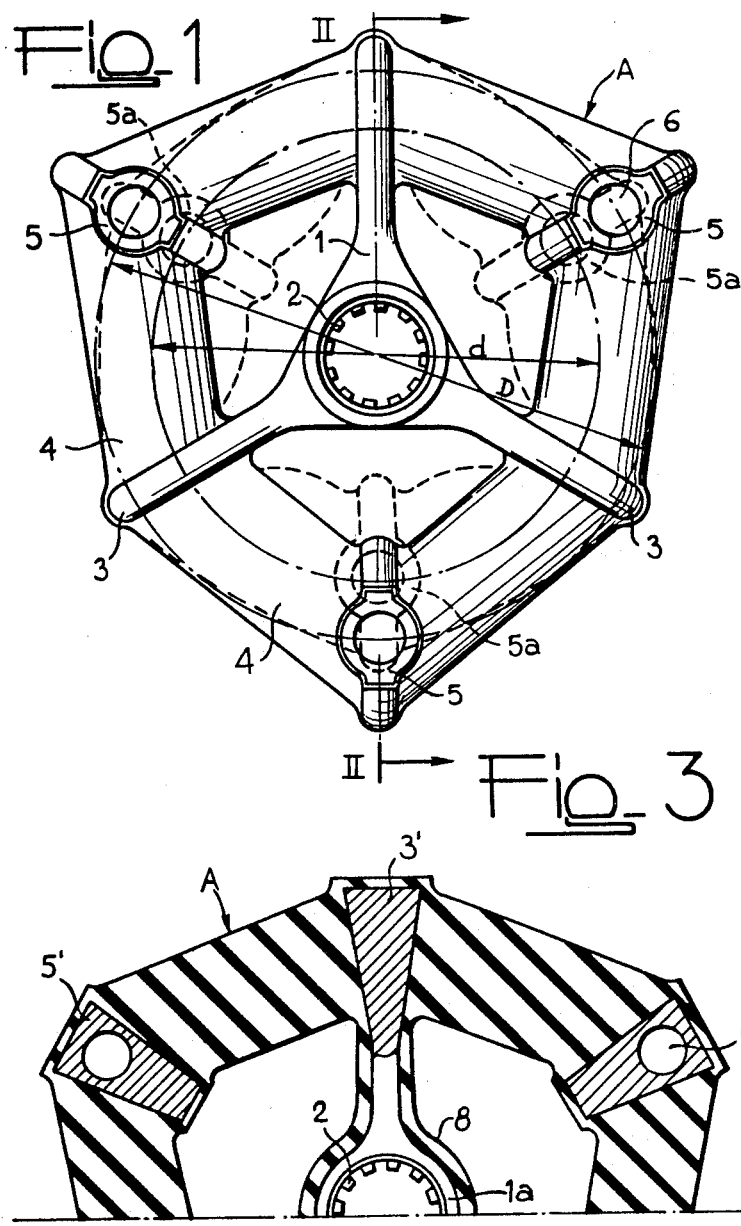
FIGURE 1 is a plan view of the coupling rings.

In FIGURE 1, a resilient body A is shown as an irregular polygon having straight sides 4 consisting of cylindrical elongated blocks of rubber subjected to pre-compression before final mounting. The solid lines indicate the outline of the polygon in its free state and the dash lines indicate its outline after pre-compression. It will be seen that prior to pre-compression, the holes 6 in metal fittings 5 located at alternate corners of the polygonic body are on a diameter D while the centers X of the other corners are on a smaller diameter $d$. After pre-compression both diameters coincide and are equal to $d$; however, it should be noted that it is not absolutely essential that the pre-compression reduce D to $d$. The concept of the invention can still be carried out by reducing D to any intermediate size approaching diameter $d$. With such an operation the medium length of the longitudinal fibers in blocks 4 is reduced and a pre-compression in said blocks is obtained which is determined by the formula:

$$P = \frac{\sqrt{D^2 + d^2 - 2D \cos 2\pi/n}}{2d \sin \frac{\pi}{n}}$$

in which: $n$=the number of rubber blocks (in the case six), and
P=the compression force produced.

A first spider 1 comprises a central hub 1a having arms 3 radially extending therefrom in an angularly uniformly spaced arrangement, the number of arms being equal to one-half the number of sides of the polygon. Each arm 3 is integrally molded within the rubber body A at those alternate corners located on the circumference of relatively smaller diameter $d$. Hub 1a has one of its ends protruding axially from the general plane of the polygonic body A, said end being formed with splines 2 which correspond to splines 2 on shaft D for the spider 1. Therefore hub 1a is easily mountable on and removable from shaft D. The end portion of hub 1a opposite from the splined end comprises a cylindrical centering bore 7a, which receives a centering head 7 formed on the opposite shaft C.

The body A, at those alternate corners lying on the circumference of a relatively greater diameter D, comprises fittings 5 which are radially directed metal plates integrally embedded and molded within the body. Plates 5 comprise bores 6 which, after pre-compression of the body A, align with bores 10 in spider arms B formed on shaft C. Bolts 9 and nuts 11 are used to secure the fittings 5 to their respective spider arms B.

Reference numerals 5a in FIG. 1 indicate the location of the fittings 5 on the circumference of diameter $d$ after pre-compression.

In FIGURE 1, each of the fittings 5 actually comprises a pair of superposed plates each formed with a semi-circular axially directed channel, said plates being joined together along their flat portions (by spot welding, for example), their semi-circular portions jointly forming a circular hole 6 for the passage of bolts 9 therethrough.

In FIGURE 1, the spider arms 3 and plates 5 are both shown as having a generally planar shape; however, in FIGURE 3 their corresponding elements 3' and 5' respectively are shown in modified form. They both are shown as having a trapezoidal cross-section and fitting 5' is shown as comprising a solid block of metal having a bore 6' therethrough. The purpose of the trapezoidal cross-section is to produce a more uniform distribtuion of the precompression forces in the rubber blocks 4.

In FIGURE 2 the coupling ring is shown in its relationship to the shafts C and D prior to assembly. The shafts C and D are to be coupled together for transmission of torque from either one to the other. Shaft C comprises spider arms B which have bolt holes 10 located in a circumference of diameter $d$.

When it is desired to couple shaft C to shaft D, the hub 1a is simply slid onto the end of shaft D and aligned with shaft C by means of centering head 7 snugly fitting into bore 7a in the hub. In order to attach the coupling ring the shaft C, it is necessary to pre-compress the ring so that holes 6 are made to lie on the same circumference as holes 10. Bolts and nuts 9 and 11 are used to complete the assembly.

It should be noted that the coupling ring could be first pre-compressed and mounted on shaft C, whereupon the hub 1a can be slid onto the splined end of the shaft D without any need of being compressed again and with a minimum of parts, time, and effort being necessary to effect this latter securing operation. This could be very important, for example, in cases where shaft C and coupling ring are ready for assembly while shaft D is not available or ready. Instead of wasting available time, the most difficult part of the mounting operation could be carried out while waiting for shaft D to be made available or ready.

Then, when shaft D is ready, the difficult operation, i.e., pre-compressing, would not have to be repeated. This advantage is not a characteristic of flexible couplings heretofore made, because in these couplings the mounting of the coupling could only be carried out when both shafts were ready for being joined together; otherwise, it would be necessary to perform the compression process twice: once when the coupling ring were to be attached to one shaft and again when it were to be attached to the other shaft.

Since the fittings 5 and spider 1 are integrally molded with the rubber body A of the coupling ring, all exterior surfaces 5 and 1 are shown covered by a layer 8 of rubber. It should be noted, however that any means, other than integral molding, for bonding fittings 5 and spider arms 3 to the opposite ends of rubber blocks 4 are within the scope of this invention.

A further advantage obtained by extending spider arms 3 within body A, as compared to the use of separate fittings and bolts as a means for securing flange 1 to rim A, is that the arms can be made thinner in cross-section than the diameter of appropriate bolts; this means that the effective length of the blocks 4 can be longer when arms such as 3 are extended into the body. A than when other attaching means such as bolts are employed to effect connection between spider 1 and body A.

What I claim is:

1. A flexible coupling for connecting together the facing ends of two rotary shafts which are in end to end relationship to each other, comprising: a closed polygonal rim, a first coupling member and vanes outwardly radially extending from said coupling member and connecting it to said rim, said first coupling member being adapted for attachment to a first rotary shaft, said rim comprising a number of resilient blocks joined together at adjoining abutting ends, each block comprising the side of a polygon and each pair of abutting ends comprising a joint, said vanes being connected to said rim at alternate ones of said joints, the other alternate joints comprising second coupling members adapted for attachment to a second rotary shaft, the polygonal shape of the rim being irregular when the rim is in a relaxed state so that the respective centers of each of the joints at which the vanes are connected lie on the circumference of a first circle and, the respective centers of each of said other alternate joints lie on the circumference of a second circle, the diameter of this second circle being greater than that of said first circle, said other alternate joints being resiliently supported with their centers on said second circle by said resilient blocks, said resilient blocks being compressible whereby said other alternate joints are radially displaceable to an extent that their centers can be displaced to lie on any point from said second circle to said first circle circumference.

2. The flexible coupling of claim 1, wherein the polygonal rim comprises an even number of sides.

3. The flexible coupling of claim 1, wherein said second coupling members comprise rigid elements embedded between the adjoining ends of said blocks at said other alternate joints, said rigid elements extending parallel to the respective joints, said rigid elements being adapted for attachment to the end of a rotary shaft.

4. The flexible coupling of claim 1, wherein said first coupling member and said vanes are all rigid, said vanes being rigidly integral with said first coupling member and being integrally embedded between the adjoining abutting ends of said resilient members at said alternate joints.

5. The flexible coupling of claim 4, wherein said vanes and second coupling members are trapezoidal in cross-section with a shorter parallel side located adjacent said first coupling member and the longer parallel side located at the outer radial periphery of the vanes.

6. A flexible coupling for torsionally connecting together the ends of two rotary shafts which are axially displaced one from the other, said coupling comprising: a closed polygonal loop of resilient material, said polygonal loop having an even number of sides, a plurality of securing means located at alternate ones of the corners of said loop, said securing means being adapted for securement to one of said shafts, a connecting member integrally embedded within said loop at the other alternate corners of said loop, said connecting member being adapted for connection to another of said shafts, the polygonal shape of the loop being irregular so that the corresponding points on said alternate corners and said other alternate corners respectively lie on the circumferences of first and second circles, said first circle having a diameter larger than that of said second circle.

References Cited by the Examiner

UNITED STATES PATENTS

| 2,708,352 | 5/1955 | Boschi | 64—14 |
| 3,112,626 | 12/1963 | Barone | 64—11 |

FOREIGN PATENTS

| Ad. 48,655 | 2/1938 | France. |
| 330,814 | 6/1930 | Great Britain. |
| 583,296 | 12/1946 | Great Britain. |
| 474,189 | 9/1952 | Italy. |

BROUGHTON G. DURHAM, *Primary Examiner.*

MILTON KAUFMAN, *Examiner.*

D. H. THIEL, *Assistant Examiner.*